UNITED STATES PATENT OFFICE.

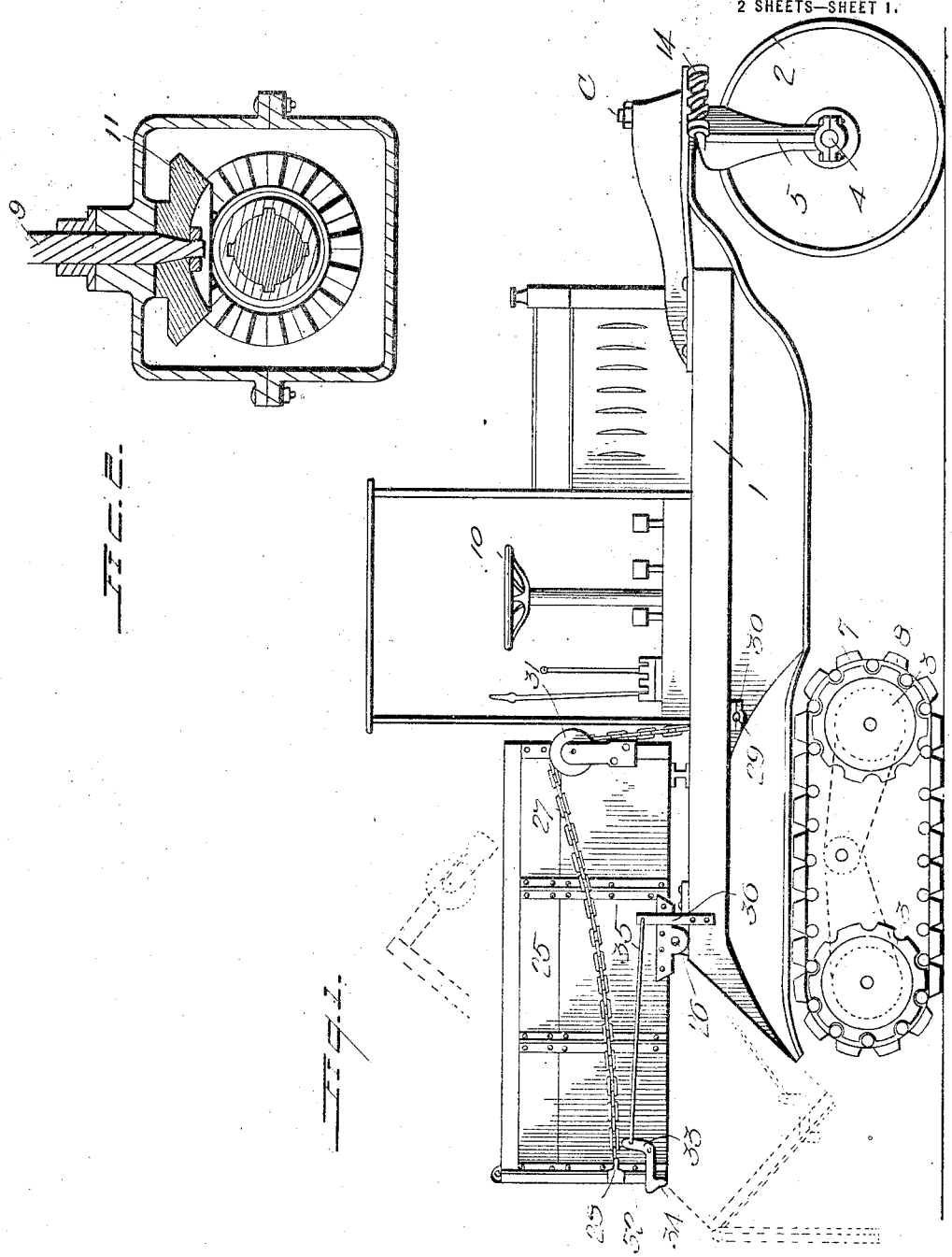

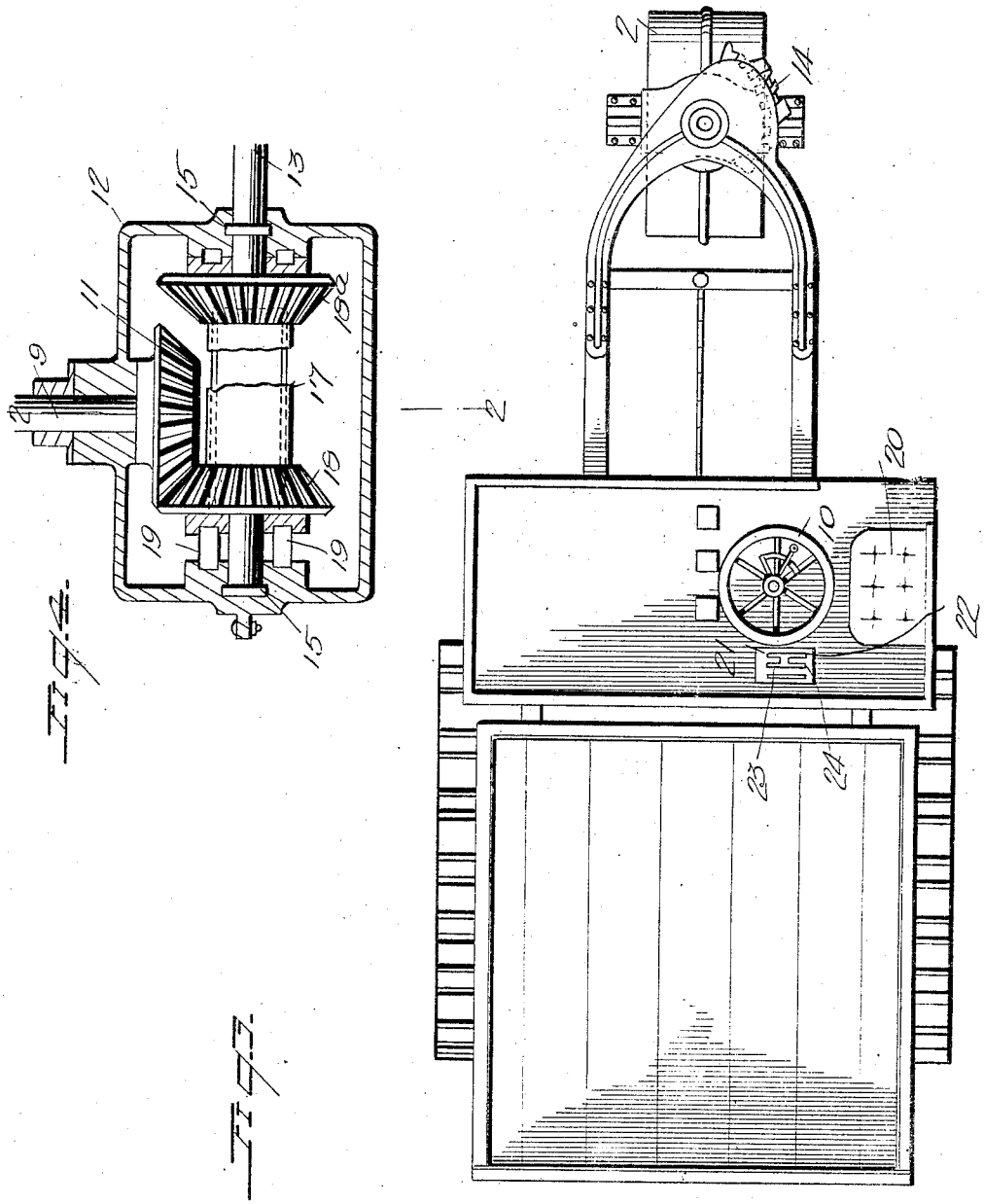

WILLIAM LOVE THOMPSON AND WILLIAM EARLE ELAM, OF GREENVILLE, MISSISSIPPI.

STEERING DEVICE FOR MOTOR-VEHICLES.

1,332,313.      Specification of Letters Patent.      Patented Mar. 2, 1920.

Application filed July 24, 1917, Serial No. 182,393. Renewed January 7, 1920. Serial No. 350,059.

*To all whom it may concern:*

Be it known that we, WILLIAM L. THOMPSON and WILLIAM E. ELAM, citizens of the United States, and residents of Greenville, in the county of Washington and State of Mississippi, have invented new and useful Improvements in Steering Devices for Motor-Vehicles, of which the following is a specification.

Our invention is an improvement in steering devices for motor vehicles, and has for its object to provide mechanism in connection with a motor vehicle for permitting the vehicle to be steered forwardly or in the reverse with equal facility, and with the same movements of the steering wheel in either direction.

A further object is to provide a new and improved dumping mechanism in connection with the motor vehicle operated by gravity to dump, and restored by power, wherein latching mechanism is provided for the rear gate controlled by the movement of the body into dumping or loading position to open and close the latching mechanism.

In the drawings:

Figure 1 is a side view of a motor vehicle provided with the improvement;

Fig. 2 is a section on the line 2—2 of Fig. 4;

Fig. 3 is a top plan;

Fig. 4 is a vertical section through the connection between the steering column and the steering mechanism.

The present embodiment of the invention is shown in connection with a motor vehicle comprising a frame 1, a front guiding wheel 2 and rear wheels 3. The front wheel has an axle or shaft 4 which is journaled in the arms 5 of a yoke, whose body has a journal pin 6 journaled in the frame, in order that the yoke may be swung on a vertical axis to guide the vehicle.

The wheels 3 are arranged in pairs at opposite sides of the vehicle, and each pair carries an endless belt 7, having treads 8, forming a caterpillar tread for the vehicle.

The vehicle, with the improved steering and dumping mechanism, is especially adapted for shuttle work without turning, being moved in the forward motion to loading position and in the reverse motion to dumping position, and the purpose of the invention is to permit the driver to guide the vehicle with the same motion of the steering wheel in either direction. In order to permit this operation, the steering column 9 which is provided with the usual wheel 10 at its top, has secured to the lower end thereof a bevel gear 11, and the said gear is mounted in a sectional casing 12. A shaft 13 is journaled longitudinally of the casing, and is extended at one end, as shown, for connection with the operating mechanism indicated at 14 for the front wheel, and this shaft has stop collars 15 in the bearings in which it is mounted for preventing movement of the same longitudinally of the casing. A sleeve 17 is feathered on the shaft, and this sleeve carries at its ends bevel gears 18 and 18ª, respectively. The sleeve is of such length that the bevel gears are spaced apart from each other a distance slightly greater than the diameter of the bevel gear 11 so that only one of the bevel gears 18 or 18ª can engage the bevel gear 11 at the same time.

Wedge blocks 19 are arranged between the ends of the sleeve and the bearings of the casing 12, the said blocks being arranged in pairs, one pair at each end of the sleeve, and suitable controlling mechanism is connected with the wedges for operating the pairs in alternation to move the sleeve in opposite directions to engage either bevel gear 18 or 18ª and the bevel gear 11.

The seat 20 of the vehicle is arranged in such manner that the driver may look ahead with ease in whichever direction the vehicle may be moving, and the wheel 10 is in front of the driver. When the vehicle is moving forwardly, that is, to the right in Fig. 3 one of the bevel gears 18 or 18ª, as the case may be, is connected to the bevel gear 11, and the driver steers in the usual manner, turning the wheel to the right to turn to the right and to the left to turn to the left. When the vehicle is reversed, he moves the sleeve 17 in the opposite direction, to disconnect the gear 18 or 18ª already connected and to connect the other gear. When now the vehicle moves in the reverse, the driver steers with the same motion that he has used, turning the wheel to the right to steer to the right and to the left to steer to the left.

Two speeds are provided for each direction of movement, the slots 21 and 22 indicating the low and high speed respectively for the forward motion, while the slots 23 and 24 indicate the low and high speeds, respectively, for the reverse motion. The cross slot between the slots 21—22 and 23—24 is a neutral position.

A dumping bed is provided at the rear of the vehicle, the said bed being pivoted intermediate its ends, as indicated at 26, to the frame. This bed is arranged to dump by gravity, and is normally held in loading position by a latch not shown or by chains 27, and returned to loading position after dumping by chains 27 which are connected at the rear ends to the door, as indicated at 28, and at their front ends wound upon a roller (not shown) secured to a shaft 29 journaled in bearings 30 on the frame. These chains pass over pulleys 31 journaled on the bed at the front thereof, and it will be obvious that when the front ends of the chains are drawn downwardly the door will be closed and the bed will be moved into loading position and will be held in such position. A gate or door 32 is provided for closing the rear end of the bed, and a latch is provided in connection with the door for holding the door closed when the bed is in loading position and for permitting the door to open when the bed is in dumping position. The said mechanism comprises bell cranks 33 pivoted to the bed at the rear thereof, each lever having on one arm a catch 34 for engaging a catch on the gate to hold the gate closed. The other arm of each lever is connected by a link 35 with an upstanding bracket 36 on the frame. It will be obvious that when the bed is dumped the latches will be lifted, releasing the gate, which will be swung open by the load and by gravity, permitting the contents of the bed to be dumped. After the bed has been dumped the shaft 30 is rotated, preferably by the motor of the vehicle to wind up the chains, to close the door and to lift the bed to loading position. The lifting of the bed to loading position automatically closes the latches 33.

We claim:

In a motor vehicle, the combination with the steering column having the steering wheel and the means for steering the vehicle, of a connection between the column and the said steering means, said connection being reversible to permit the steering wheel moving in the same direction to operate the steering means in the opposite direction, and a seat arranged laterally with respect to the steering wheel for permitting the driver to face in either direction while controlling the wheel.

WILLIAM LOVE THOMPSON.
WILLIAM EARLE ELAM.